(12) United States Patent
Gan

(10) Patent No.: US 8,946,120 B2
(45) Date of Patent: Feb. 3, 2015

(54) METHOD FOR PREPARING BORON FERTILIZER

(75) Inventor: Lin Gan, Wuhan (CN)

(73) Assignee: Wuhan Fishery Agricultural Science and Technology Co., Ltd., Wuhan (CN)

( * ) Notice: Subject to any disclaimer, the term of this patent is extended or adjusted under 35 U.S.C. 154(b) by 112 days.

(21) Appl. No.: 13/327,724

(22) Filed: Dec. 15, 2011

(65) Prior Publication Data

US 2012/0088666 A1   Apr. 12, 2012

Related U.S. Application Data

(63) Continuation of application No. PCT/CN2010/073869, filed on Jun. 12, 2010.

(30) Foreign Application Priority Data

Jun. 16, 2009 (CN) .......................... 2009 1 0062668

(51) Int. Cl.
| | |
|---|---|
| *A01N 59/14* | (2006.01) |
| *A01N 61/00* | (2006.01) |
| *C05D 9/02* | (2006.01) |
| *C01B 35/10* | (2006.01) |

(52) U.S. Cl.
CPC .............. *C05D 9/02* (2013.01); *C01B 35/1036* (2013.01); *C01B 35/1045* (2013.01)

USPC ........... 504/101; 504/122; 424/657; 424/659; 71/31; 71/32; 71/54; 71/61

(58) Field of Classification Search
None
See application file for complete search history.

(56) References Cited

U.S. PATENT DOCUMENTS 5,651,949 A  *  7/1997  Fisher et al. .................. 423/278

FOREIGN PATENT DOCUMENTS

CN         101585719 A  *  11/2009

* cited by examiner

*Primary Examiner* — Abigail Fisher
*Assistant Examiner* — Frank Choi
(74) *Attorney, Agent, or Firm* — Matthias Scholl P.C.; Matthias Scholl

(57) ABSTRACT

A method for preparing a boron fertilizer, including: (1) heating boric acid to a temperature of 180-200° C., maintaining the temperature for 20-30 min for dehydration of the boric acid to yield pyroboric acid; and (2) cooling down the pyroboric acid to a temperature of 40-60° C., crushing, and screening to yield a powdered, weakly acidic, high-content boron fertilizer. The method is energy-saving, environmentally friendly, and low in cost. The resulting boron fertilizer is weakly acidic, fast in dissolution rate, and has excellent in compounding performance

14 Claims, No Drawings

METHOD FOR PREPARING BORON FERTILIZER

CROSS-REFERENCE TO RELATED APPLICATIONS

This application is a continuation of International Patent Application No. PCT/CN2010/073869 with an international filing date of Jun. 12, 2010, designating the United States, now abandoned as to the United States, and further claims priority benefits to Chinese Patent Application No. 200910062668.8 filed Jun. 16, 2009. The contents of all of the aforementioned applications, including any intervening amendments thereto, are incorporated herein by reference.

BACKGROUND OF THE INVENTION

1. Field of the Invention

The invention relates to a preparation method for a boron fertilizer, and more particularly to a preparation method for a weak acidic boron fertilizer comprising high content of pure boron.

2. Description of the Related Art

The content of pure boron in conventional boron fertilizers is normally lower than 20%. Such a boron fertilizer is known as a low-content boron fertilizer and generally used as a base fertilization, i.e. root fertilization. The boron fertilizer with pure boron content higher than 20% is known as a high-content boron fertilizer and generally used as foliar fertilization. At present, all high-content boron fertilizers at home and abroad are obtained by dehydrating borax decahydrate under a temperature of 350-450° C. The pure boron content in such high-content boron fertilizers is 21.48% in theory while in fact it is 20-21%, and with the following disadvantages:

1. production costs are high due to complicated production process and large energy consumption;
2. since the obtained boron fertilizer is alkaline, it is slow in dissolution rate and poor in compounding performance; and
3. pure boron content cannot be further increased.

SUMMARY OF THE INVENTION

In view of the above-described problems, it is one objective of the invention to provide a method for preparing a weak acidic high-content boron fertilizer.

In accordance with one embodiment of the invention, there provided is a method for preparing a boron fertilizer, comprising the following steps:

(1) Heating boric acid to a temperature of 180-200° C., maintaining the temperature for 20-30 min for dehydration of the boric acid to yield pyroboric acid; and
(2) Cooling down the pyroboric acid to a temperature of 40-60° C., crushing, and screening to yield a powdered weak acidic high-content boron fertilizer.

In a class of this embodiment, a high-speed pulverizer or a pneumatic pulverizer is used for the crushing and a 100-200 mesh screen is used for the screening.

In a class of this embodiment, the weak acidic high-content boron fertilizer is added with one or more fertilizer selected from the group consisting of nitrogen, phosphorus, potassium, magnesium, sulfur, manganese, zinc, copper, iron, and molybdenum.

In a class of this embodiment, the weak acidic high-content boron fertilizer is added with a bactericide.

In a class of this embodiment, the weak acidic high-content boron fertilizer is added with a pesticide.

The pure boron content in the weak acidic pyroboric acid obtained after dehydration of the boric acid under the temperature of 180-200° C. is in theory 27.5% and in fact 22.5-23.5%. If the dehydration temperature is raised above 200° C., boric anhydride is obtained. The pure boron content in the boric anhydride is in theory 31.05%. However, since the boric anhydride is in the shape of glass particles in its physical properties, it cannot be processed into a boron fertilizer as a result. Hence, in spite of high content of pure boron, the boric anhydride cannot be used as a boron fertilizer. For this reason, the dehydration temperature of boric acid is set to 180-200° C. in the invention, so that the boric acid can be processed into a boron fertilizer by means of dehydration and meanwhile the pure boron content in the boron fellilizer can reach a higher level.

Advantages of the invention are summarized below:

1. because the dehydration temperature used in the invention is relatively lower than that used in the conventional preparation method for boron fertilizers, thus the preparation method herein is energy saving and environmental friendly and meanwhile lower production costs are achieved due to shortened production time;
2. since the obtained boron fertilizer is weak acidic, it is fast in dissolution rate and excellent in compounding performance; and
3. higher pure boron content is obtained to 22.5-23.5%.

DETAILED DESCRIPTION OF THE EMBODIMENTS

For further illustrating the invention, experiments detailing a method for preparing a weak acidic high-content boron fertilizer are described below. It should be noted that the following examples are intended to describe and not to limit the invention.

Example 1

(1) 100 kg of boric acid was heated to a temperature of 180° C. in a drying oven. The temperature was maintained for 20-30 min for dehydration of the boric acid and pyroboric acid was obtained.

(2) The obtained pyroboric acid was cooled down to a temperature of 40-60° C., crushed using a high-speed pulverizer or a pneumatic pulverizer under 3,000 rpm, and screened using a 100-200 mesh screen to yield 90 kg of a powdered weak acidic high-content boron fertilizer with pure boron content of 22.7%.

Optionally, the cooled pyroboric acid may be first made into a liquid and then the liquid was treated by means of high-temperature spraying to yield the powdered weak acidic high-content boron fertilizer.

Example 2

Following Example 1 except that the dehydration temperature was controlled at 190° C., thus a weak acidic high-content boron fertilizer with pure boron content of 23.1% was obtained.

Example 3

Following Example 1 except that the dehydration temperature was controlled at 200° C., thus a weak acidic high-content boron fertilizer with pure boron content of 23.6% was obtained.

During the preparation of the boron fertilizer, one or more fertilizer selected from the group consisting of nitrogen, phosphorus, potassium, magnesium, sulfur, manganese, zinc, copper, iron, and molybdenum as well as a bactericide and pesticide may be added. Furthermore, in use, the boron fertilizer can be mixed with afoliar fertilizer, agrochemical, and another bactericide and pesticide.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for preparing a boron fertilizer, the method comprising the following steps:
   a) heating boric acid to a temperature of less than 200° C. and not less than 180° C., maintaining the temperature for 20-30 min for dehydration of the boric acid to yield pyroboric acid; and
   b) cooling down the pyroboric acid to a temperature of 40-60° C., crushing, and screening to yield the boron fertilizer, wherein the boron fertilizer has a pure boron content of between 22.5% and 23.5%.

2. The method of claim 1, wherein a high-speed pulverizer or a pneumatic pulverizer is used for the crushing and a 100-200 mesh screen is used for the screening.

3. The method of claim 2, wherein the boron fertilizer is added with one or more fertilizer selected from the group consisting of nitrogen, phosphorus, potassium, magnesium, sulfur, manganese, zinc, copper, iron, and molybdenum.

4. The method of claim 2, wherein the boron fertilizer is added with a bactericide.

5. The method of claim 2, wherein the boron fertilizer is added with a pesticide.

6. The method of claim 1, wherein the boron fertilizer is added with one or more fertilizer selected from the group consisting of nitrogen, phosphorus, potassium, magnesium, sulfur, manganese, zinc, copper, iron, and molybdenum.

7. The method of claim 1, wherein the boron fertilizer is added with a bactericide.

8. The method of claim 1, wherein the boron fertilizer is added with a pesticide.

9. The method of claim 1, wherein the temperature for dehydration of the boric acid is 190° C.

10. The method of claim 1, wherein the temperature for dehydration of the boric acid is 180° C.

11. A method for preparing a boron fertilizer, the method comprising:
    a) heating boric acid to a temperature of 200° C., maintaining the temperature for 20-30 min to yield pyroboric acid; and
    b) cooling down the pyroboric acid to a temperature of 40-60° C., crushing it, and screening it to yield the boron fertilizer, wherein the boron fertilizer has a pure boron content of 23.6%.

12. A method for preparing a boron fertilizer, the method comprising:
    a) heating boric acid to a temperature of 180° C., maintaining the temperature for 20-30 min to yield pyroboric acid; and
    b) cooling down the pyroboric acid to a temperature of 40-60° C., crushing it, and screening it to yield the boron fertilizer, wherein the boron fertilizer has a pure boron content of 22.7%.

13. A method for preparing a powdered weak acidic boron fertilizer, the method comprising:
    a) heating boric acid to a temperature of 190° C., maintaining the temperature for 20-30 min to yield pyroboric acid; and
    b) cooling down the pyroboric acid to a temperature of 40-60° C., crushing, and screening to yield the boron fertilizer, wherein the boron fertilizer has a pure boron content of 23.1%

14. A method for preparing a boron fertilizer, the method comprising:
    a) heating boric acid to a temperature of 180-190° C., maintaining the temperature for 20-30 min to yield pyroboric acid; and
    b) cooling down the pyroboric acid to a temperature of 40-60° C., crushing, and screening to yield the boron fertilizer, wherein the boron fertilizer has a pure boron content of 22.7-23.1%.

* * * * *